United States Patent [19]

Jarvela et al.

[11] Patent Number: 5,113,436
[45] Date of Patent: May 12, 1992

[54] TELEPHONE HANG-UP CUP HAVING RECTRACTABLE LATCH MEMBER OPERATIVE RESPONSIVE TO ACTUATION FORCE APPLIED AT EITHER SIDE THEREOF

[75] Inventors: John P. Jarvela, Wheeling; Michael F. Spence, Arlington-Heights, both of Ill.

[73] Assignee: Motorola, Inc., Schaumburg, Ill.

[21] Appl. No.: 516,371

[22] Filed: Apr. 30, 1990

[51] Int. Cl.$^5$ ............................................. H04M 1/00
[52] U.S. Cl. .................................. 379/455; 379/419; 379/442; 379/441; 379/454
[58] Field of Search ................... 379/58, 59, 188, 424, 379/425, 426, 437, 440, 443, 446, 449, 454, 455, 441

[56] References Cited

U.S. PATENT DOCUMENTS

| | | | |
|---|---|---|---|
| 4,709,389 | 11/1987 | Langerberg et al. | 379/424 |
| 4,710,596 | 12/1987 | Kurokawa | 379/424 |
| 4,723,281 | 2/1988 | Peiker et al. | 379/445 |
| 4,741,034 | 4/1988 | Errichiello et al. | 379/455 |
| 4,782,526 | 11/1988 | Uchino et al. | 379/425 |
| 4,937,859 | 6/1990 | Osterloh | 379/435 |

FOREIGN PATENT DOCUMENTS 2595525 9/1987 France ............................ 379/437

OTHER PUBLICATIONS

Motorola, "Technical Developments", vol. 3, pp. 8, 9 Mar. 1983.
Motorola "DYNA T.A.C. Cellular Mobile Telephone" Mechanical Parts, Control Unit, Jun. 15, 1983.
Photographs of a telephone handset of a Panasonic 3500 mobile telephone sold in the U.S. at least as early as Mar. 1989.

Primary Examiner—James L. Dwyer
Assistant Examiner—William Cumming
Attorney, Agent, or Firm—Robert H. Kelly

[57] ABSTRACT

A telephone receptacle for releasably affixing a portion of a telephone handset thereto. A retractable latch member latchingly engages with a corresponding, mated latching surface formed on the telephone handset when the latch member is positioned in the latch position. An actuation force applied to either the left-hand side portion, or the right-side portion of the telephone receptacle retracts the retractable latch member into a release position thereby permitting the telephone handset to be removed from the telephone receptacle.

3 Claims, 3 Drawing Sheets

TELEPHONE HANG-UP CUP HAVING RECTRACTABLE LATCH MEMBER OPERATIVE RESPONSIVE TO ACTUATION FORCE APPLIED AT EITHER SIDE THEREOF

BACKGROUND OF THE INVENTION

The present invention relates generally to telephone receptacles, and, more particularly, to a mobile telephone hang-up cup which may be mounted upon any support location of an automobile.

Improvements in the field of cellular communications have permitted ever more cost-efficient cellular telephone systems to be utilized by ever greater numbers of users. Because of the unique conveniences afforded by cellular communications, and the increasingly modest costs of communicating therewith, use of mobile and other portable cellular phones has increased dramatically in recent years.

Cellular communication systems permit a user to communicate telephonically at virtually any location. While cellular communication systems may be advantageously utilized for any telephonic communication in which access to conventional telephone communication systems is not available, cellular communication systems are perhaps most frequently utilized by operators travelling in an automobile.

A cellular phone carried in an automobile is commonly referred to as a mobile phone for the reason that the telephone must be constructed to permit usage thereof as the automobile is travelling at a speed towards or away from a cellular receiving station. The telephone transmits a low wattage, radio frequency signal to the receiving station whereat connections are provided with a conventional telephone system. Numerous receiving stations are positioned at spaced-apart locations in a subscriber area wherein each receiving station defines a "cell". As the automobile in which the mobile telephone is positioned travels through successive cells, the signals transmitted by the mobile telephone are received by successive receiving stations.

Because the operator of the mobile telephone is many times the driver of the automobile in which the mobile telephone is carried, the mobile phone must be of a design to permit the user to perform normal driving functions while simultaneously operating the mobile phone to communicate therewith. Conventionally, a mobile telephone includes a handset, similar to a handset of a conventional telephone having both a receiver portion (i.e., an ear piece) and a transmitter portion (i.e., a mouthpiece). The handset is electrically coupled to transmit/receive circuitry which, in turn, is connected to a suitable power supply, and, if desired, also to amplification circuitry.

Most mobile telephones further include apparatus for supporting the handset portion of the telephone when the handset is not utilized by the operator of the phone. The handset may be supported by the support apparatus when the mobile phone is not utilized to send or receive information (i.e., when the phone is not being used), or, when the mobile phone is operated in the "hands free" mode in which, similar to a conventional telephone speaker phone, a speaker element coupled to the transmit/receive circuitry of the mobile phone is utilized to perform the functions of both the receiver portion and the transmitter portion of the handset.

Such support apparatus must be of a design to permit positioning thereof so as to permit the operator of the mobile telephone to quickly and conveniently remove the telephone handset therefrom when the operator desires to utilize the telephone handset. Additionally, the support apparatus must be of a design to permit the operator to quickly and conveniently reposition the telephone handset upon the support apparatus when the handset is no longer utilized.

This support apparatus, usually referred to as a telephone receptacle or a hang-up cup, may be mounted, for example, upon the dashboard of an automobile, upon an arm rest portion of the automobile, or within the glove compartment of the automobile. At any of these mounting locations, the telephone receptacle may be mounted in position by means of threaded shaft members affixing the telephone receptacle directly to the respective mounting location. The telephone receptacle may also be affixed to a mounting assembly which, in turn, is affixed to the respective mounting location. Alternately, the telephone receptacle may be mounted at the mounting location by positioning a two-sided adhesive to interconnect the telephone receptacle and the mounting location. Use of the two-sided adhesive to affix the telephone receptacle to the support location of the automobile is advantageous for reasons of ease of installation; however, the permanency of the affixation of the telephone receptacle to the mounting location is reduced.

Several existing designs of telephone receptacles which may be mounted at the mounting locations of the automobile are comprised of housings containing a face surface having a recessed area of dimensions permitting the positioning of a portion of the telephone handset thereat. Latch members formed integral with the telephone receptacle, and projecting from sidewalls defining the recessed area, latchingly engage with corresponding, mated latching surfaces formed on the telephone handset to permit latching engagement therebetween. Typically, these telephone receptacle designs include two latch members formed to project from two opposing sidewalls of the sidewalls defining the recessed area. The mobile telephone operator removes the telephone handset from the telephone receptacle by grasping the telephone handset, and, in an "up and out" movement pulls the telephone handset away from the telephone receptacle. In order to reposition the telephone handset at the telephone receptacle, the mobile telephone operator reverses this procedure to reinsert the portion of the telephone handset into the recessed area to engage the latch members projecting from the opposing sidewalls with the corresponding, mated latching surfaces of the telephone handset. However, when removing the telephone handset from the telephone receptacle, the mobile telephone operator exerts a rotational torque upon the telephone handset. This rotational torque, or a component portion thereof, is transmitted to the telephone receptacle. Particularly in instances in which the telephone receptacle is affixed to the support location of the automobile by the two-sided adhesive, this torque transmitted to the telephone receptacle may be great enough to pull the entire telephone receptacle away from the mounting location of the automobile.

In order to reduce the amount of torque required to remove the handset from the telephone receptacle, several other existing telephone receptacle designs substitute one of the latch members formed integral with one of the sidewalls defining the recessed area with a retractable latch member. The retractable latch member may be positioned either in or out of a latching position. A button-type actuator is interconnected with the retractable latch member such that a force applied to the button causes retraction of the retractable latch out of the latching position. When the retractable latch is positioned in the retracted position, the torque required in order to remove the telephone handset from the telephone receptacle is reduced.

The button-type actuator is positioned to permit actuation thereof at either a left-hand side or a right-hand side of the telephone receptacle. Forces applied to the button portion of the actuator are transmitted to the retractable latch member to move the latch member out of the latching position. However, because the button portion of the actuator is positioned at either the left-hand side or the right-hand side of the telephone receptacle, the receptacle essentially becomes a right-handed or left-handed design depending upon the side at which the button portion is positioned. Such designs are disadvantageous for the reason that the telephone receptacle most suited for one mobile phone operator may not be best suited for a subsequent operator.

Additionally, a telephone receptacle having an actuator acessible at only one side thereof limits the locations at which the receptacle may be mounted. For example, a telephone receptacle having an actuator acessible at only the left-side portion of the receptacle can not be mounted directly to the right of an arm rest, as the actuator would not be accessible to permit actuation thereof.

One existing design includes an actuator for retracting the retractable latch having button actuators positioned at both left-hand and right-hand sides of the telephone receptacle. This design, however, requires both of the button actuators to be actuated simultaneously in order to retract the retractable latch to facilitate release of the telephone handset. This design is disadvantageous for the reason that the telephone receptacle cannot be positioned proximate to any abutment, such as an armrest, as both sides of the receptacle must be accessible.

What is needed, therefore, is a telephone receptacle having a retractable latch which may be positioned in a retracted position by actuation of an actuator positioned at either the left-hand, or right-hand side of the receptacle.

Another existing design similarly includes an actuator having button actuators positioned at both left-hand and right-hand sides of the telephone receptale. Actuation of either button actuator causes retraction of the retractable latch. However, the actuators are independent of one another, and actuation of one button actuator does not affect the second actuator. A spring separating the button actuators is required in order to facilitate repositioning of the retractable latch in the latching position once the button actuator is no longer actuated.

SUMMARY OF THE INVENTION

It is accordingly an object of the present invention to provide a telephone receptacle for supporting a telephone handset therefrom.

It is a further object of the present invention to provide a telephone receptacle for a mobile telephone, wherein the telephone receptacle may be mounted upon any support location of an automobile.

It is a still further object of the present invention to provide a telephone receptacle having a retractable latch member which may be positioned in the retracted position by the application of an actuation force at either a left-hand side or a right-hand side of the telephone receptacle.

In accordance with the present invention, therefore, a telephone receptacle for receiving a portion of a telephone handset of a transceiver is disclosed. The telephone receptacle includes a receptacle housing and a release mechanism for releasably affixing the telephone handset thereto. An actuator, having a first side thereof positioned at a first side portion of the receptacle housing, and a second side thereof positioned at a second side portion of the receptacle housing actuates the release mechanism such that an actuation stimulus applied to either the first side or the second side, or both the first and the second sides, respectively, of the actuator causes the release mechanism to release the telephone handset from the receptacle housing, thereby permitting movement of the telephone handset thereaway.

BRIEF DESCRIPTION OF THE DRAWINGS

The present invention will be better understood when read in light of the accompanying drawings in which.

DESCRIPTION OF THE PREFERRED EMBODIMENT

Figure 1:
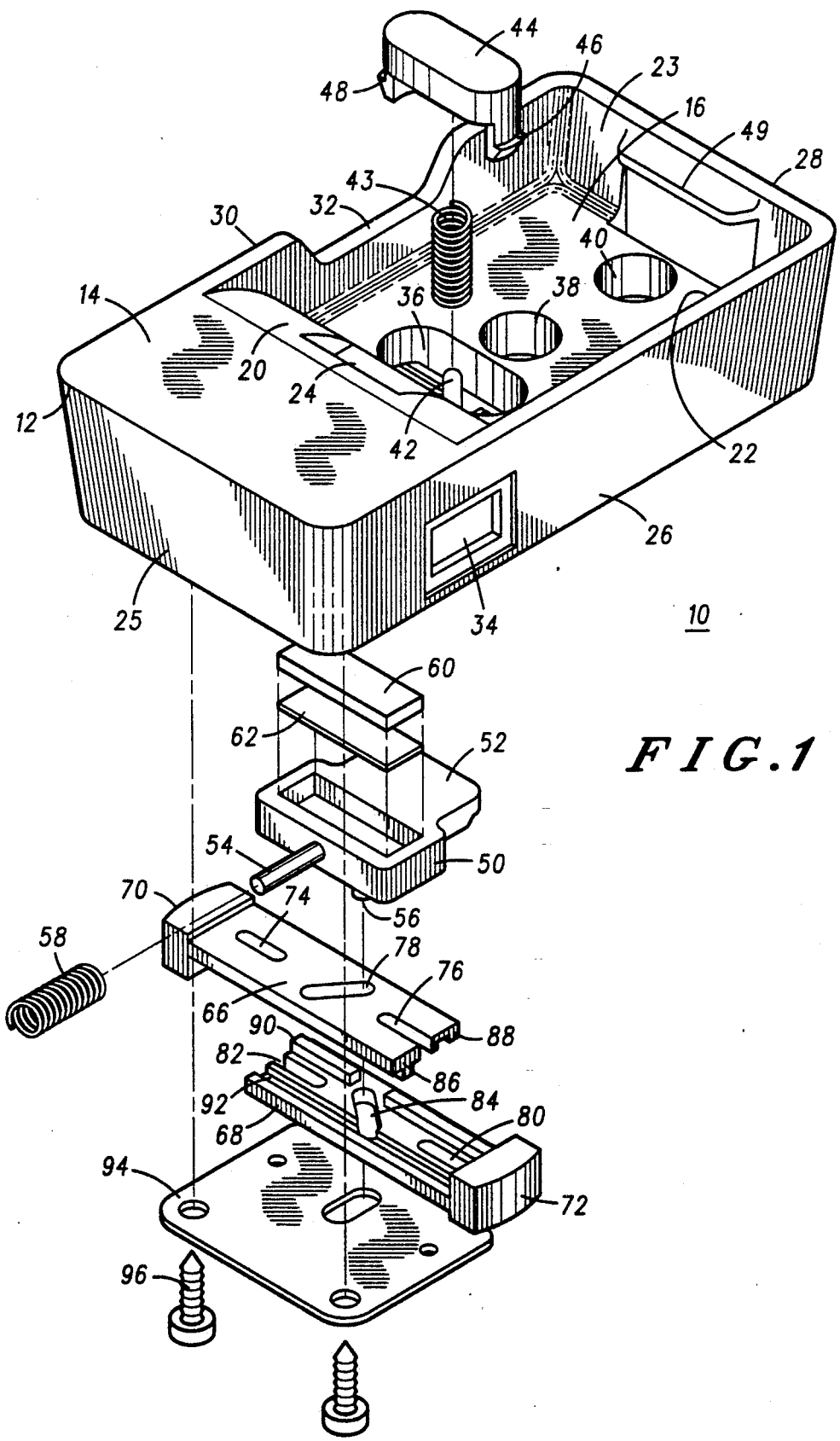
FIG. 1 is an exploded view of the telephone receptacle of the present invention.

Referring first to FIG. 1, the telephone receptacle of the present invention, referred to generally by reference numeral 10, is shown in exploded form. Telephone receptacle 10 includes receptacle housing 12 containing a top face surface 14 having a recessed area defining recessed surface 16. Sidewalls 18, 20, 22, and 23 interconnect face surface 14 and recessed surface 16. Sidewall 20, in the preferred embodiment, extends angularly downwardly to interconnect face surface 14 and recessed surface 16. Slotted opening 24 is additionally formed to extend through sidewall 20 interconnecting face surface 14 and recessed surface 16.

Receptacle housing 12 further includes sidewalls 25, 26, 28, and 30 extending downwardly from end portions of face surface 14. In the preferred embodiment, sidewall 30 of receptacle housing 12 further includes recessed portion 32. Formed to extend through sidewall 26, and, although hidden from view, also through sidewall 30, are slotted openings 34.

Recessed surface 16 further includes depressions 36, 38, and 40 formed therein. Depressions 38 and 40 contain center bores extending therethrough to permit threaded shaft members (not shown) to affix the receptacle housing 12 to a mounting location of an automobile upon which telephone receptacle 10 is to be mounted. Projecting tab 42 projects upwardly from a center portion of depression 36 and is of dimensions to permit seating of a first side of spring member 43 thereabout. Second side of spring member 43 engages with button 44 having flanged, projecting tabs 46 and 48 extending downwardly from side portions thereof. Button 44 is of dimensions to permit positioning at depression 36 such that projecting tabs 46 and 48 extend through openings formed on the bottom surface of depression 36.

Formed on sidewall 23 opposing sidewall 20 containing slotted opening 24 is fixed latch member 49 to project therefrom. Preferably, fixed latch member 49 is formed integral with sidewall 23.

Telephone receptacle 10 further includes retractable latch member 50 having latch surface 52 formed of a portion thereof. Latch surface 52 is of dimensions to permit insertion of surface 52 through slotted opening 24 formed in sidewall 20 of the receptacle housing 12. Projecting tabs 54 and 56, formed integral with latch member 50 project from the main body area of the latch member 50. Projecting tab 54 is of dimensions to permit seating of a first side of spring 58 thereabout. Magnet 60 is affixed upon a top surface of the body of latch member 50 by adhesive pad 62, such as a strip of two-sided adhesive tape such that, when latch surface 52 is positioned to extend through slotted opening 24, magnet 60 is positioned directly beneath the face surface 14 of receptacle housing 12.

Telephone receptacle 10 further includes longitudinally extending plate members 66 and 68 having flanged end portions 70 and 72, respectively, forming force receiving surfaces. Plate member 66 includes longitudinal openings 74 and 76, and slotted opening 78. Similarly, plate member 68 includes longitudinal openings 80 and 82, and slotted opening 84. Formed to extend longitudinally along the length of the bottom surface of plate member 66 are rail member 86 and track member 88. Similarly, but formed to extend longitudinally along a top surface of plate member 68, are rail member 90 and track member 92.

Plate members 66 and 68 and rail and track members 86 and 92 formed on bottom and top surfaces, respectively, of the respective plate members and are of dimensions to permit interfitting engagement therebetween to permit relative sliding movement between the plate members when positioned in a confronting relationship. Similarly, track member 88 of plate member 66 and rail member 90 of plate member 68 are of dimensions to permit interfitting engagement such that sliding movement between the plate member 66 and 68 is permitted when positioned in a confronting relationship.

Slotted openings 78 and 84 are of dimensions to permit extension of projecting tab 56 of retractable latch member 50 therethrough.

Telephone receptacle 10 further includes latch support bracket 94 having bores formed to extend therethrough to permit insertion of threaded shaft members 96 thereat. Threaded shaft members 96 threadedly engage with corresponding threaded bores formed to extend into a bottom surface of receptacle housing 12 to affix bracket 94 thereto such that bracket 94 supports retractable latch member 50 and plate members 66 and 68 in position thereabove.

Figure 2:
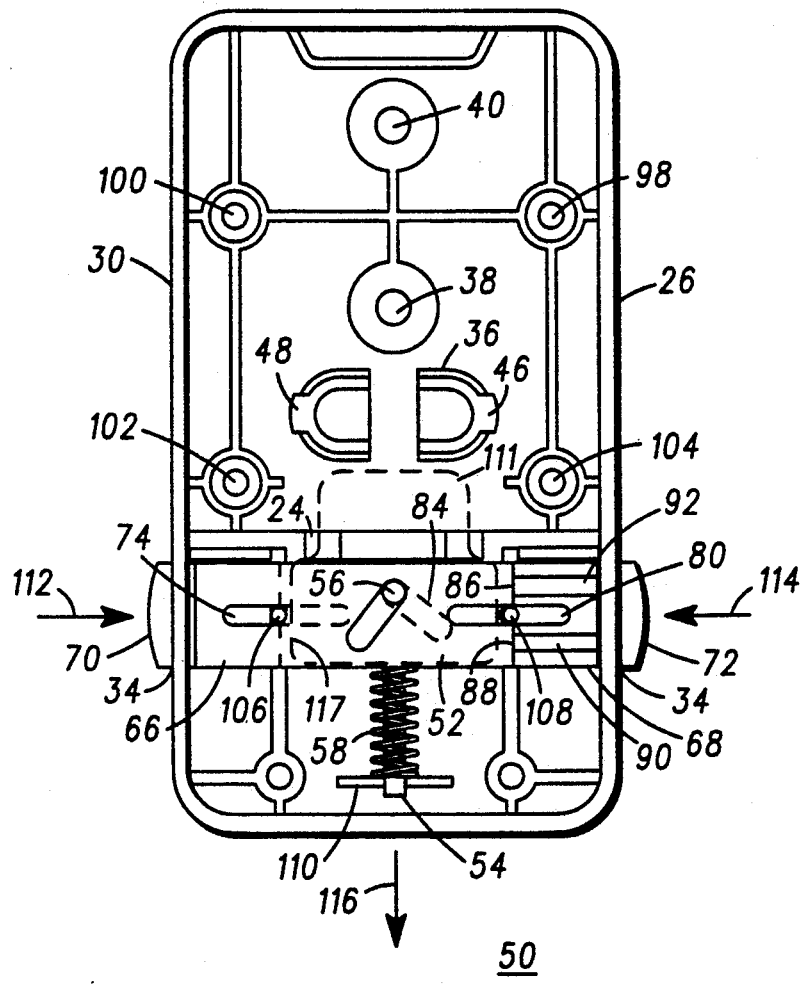
FIG. 2 is a bottom view of the telephone receptacle shown in the exploded view of FIG. 1 with the latch support bracket forming a portion of the preferred embodiment of the present invention removed therefrom.

Turning now to the bottom view of FIG. 2, telephone receptacle 10 of the present invention is shown with the latch support bracket 94, illustrated in FIG. 1, removed therefrom to better illustrate the interrelationship between retractable latch member 50 and plate members 66 and 68. The bottom view of FIG. 2 further illustrates threaded bores 98, 100, 102, and 104, formed to extend into the bottom surface of receptacle housing 12 to permit threaded engagement thereat with threaded shaft members of external mounting apparatus (not illustrated). Such mounting apparatus may be utilized in order to affix receptacle housing 12 of telephone receptacle 10 to an automobile mounting location; alternately, and as mentioned previously, threaded shaft members extending through depressions 38 and 40 may be utilized to mount receptacle 10 upon an automobile mounting location. End, flanged portions of projecting tabs 46 and 48 which extend through openings formed through depression 36 are also shown in the bottom view of FIG. 2.

Longitudinally extending plate members 66 and 68 are aligned with one another such that rail member 86 of plate member 66 is positioned in an interfitting relationship with track member 92 of plate member 68, and rail member 90 of plate member 68 is positioned in an interfitting relationship with track member 88 of plate member 66 to permit sliding engagement therebetween. End portions of the plate members 66 and 68 extend through slotted openings 34 formed to extend through sidewalls 26 and 30, respectively, such that force receiving surface 70 and 72 project beyond the surfaces of the respective sidewalls 30 and 26.

Projecting tabs 106 and 108 formed to extend downwardly beneath a bottom surface of receptacle housing 12 extend through longitudinal openings 74 and 80 of plate members 66 and 68, respectively. Similarly, projecting tab 56 formed to extend beneath latch member 50 extends through slotted opening 84, shown in hatch in FIG. 2, of plate member 68, and slotted opening 78 of plate member 66. Spring 58 seated about a first side thereof against projecting tab 54 of retractable latch member 50 is seated at a second side thereof against mounting block 110 also formed integral with receptacle housing 12 and extending beneath a bottom side of face surface 14.

When positioned as illustrated, latch surface 52 of retractable latch member 50 extends through slotted opening 24 such that latch surface 52 of latch member 50 is in a latch position illustrated in hatch by reference numberal 111 to latchingly engage with a portion of a telephone handset positioned to extend into the recessed area formed on face surface 14. However, an actuation force applied to either force receiving surface 70 in the direction illustrated by arrow 112, or upon force receiving surface 72 in the direction illustrated by arrow 114 causes translation of the respective plate members 66 and 68. Translation of plate members 66 and 68, responsive to actuation forces applied to force receiving surfaces 70 or 72 exerts forces upon projecting tab 56 projecting beneath latch member 50. Because slotted openings 78 and 84 extend at angle relative to the direction of translation permitted of plate members 66 and 68, a component force transmitted to projecting tab 56 causes translation of latch member 50 in the direction illustrated by arrow 116. Translation of latch member 50 in the direction of arrow 116 causes similar translation of latch surface 52 such that the latch surface 52 no longer projects beyond the surface of sidewall 20, thereby removing latch surface 52 from a latching position and positioning latching surface 52 in a release position illustrated by reference numeral 117.

A telephone handset positioned to extend into the recessed area formed on face surface 14 is no longer latchingly engaged with the latch surface 52 when latch surface 52 of latch member 50 is positioned in the release position 117. The telephone handset may then be removed from the telephone receptacle 10. When no actuation force is applied to any of the force receiving surfaces 70 and 72, the spring force exerted by spring 58 causes translation of latch member 50 to reposition latch surface 52 of latch member 50 back into the latch position 111.

Translation of latch member 50, and, hence, projecting tab 56 formed integral therewith, exerts forces upon plate members 66 and 68 through engagement of tab 56 with angled slot members 78 and 84. Components of these forces in the directions opposite those illustrated by arrows 112 and 114 cause translation of plate members 66 and 68 to reposition force receiving surfaces 70 and 72 to permit actuation forces to be applied again thereto.

It is to be noted that an actuation force applied to surface 70 in the direction of arrow 112 causes translation of plate member 68 in the direction of arrow 114. Similarly, an actuation force exerted upon surface 72 in the direction of arrow 114 causes translation of, not only plate member 68, but also translation of plate member 66 in the direction of arrow 112. Furthermore, dual actuation forces applies to both surfaces 70 and 72 in the directions of arrows 112 and 114 may, by summation of forces, cause translation of latch surface 52 out of the latch position 111 and into the release position 117.

Figure 3:
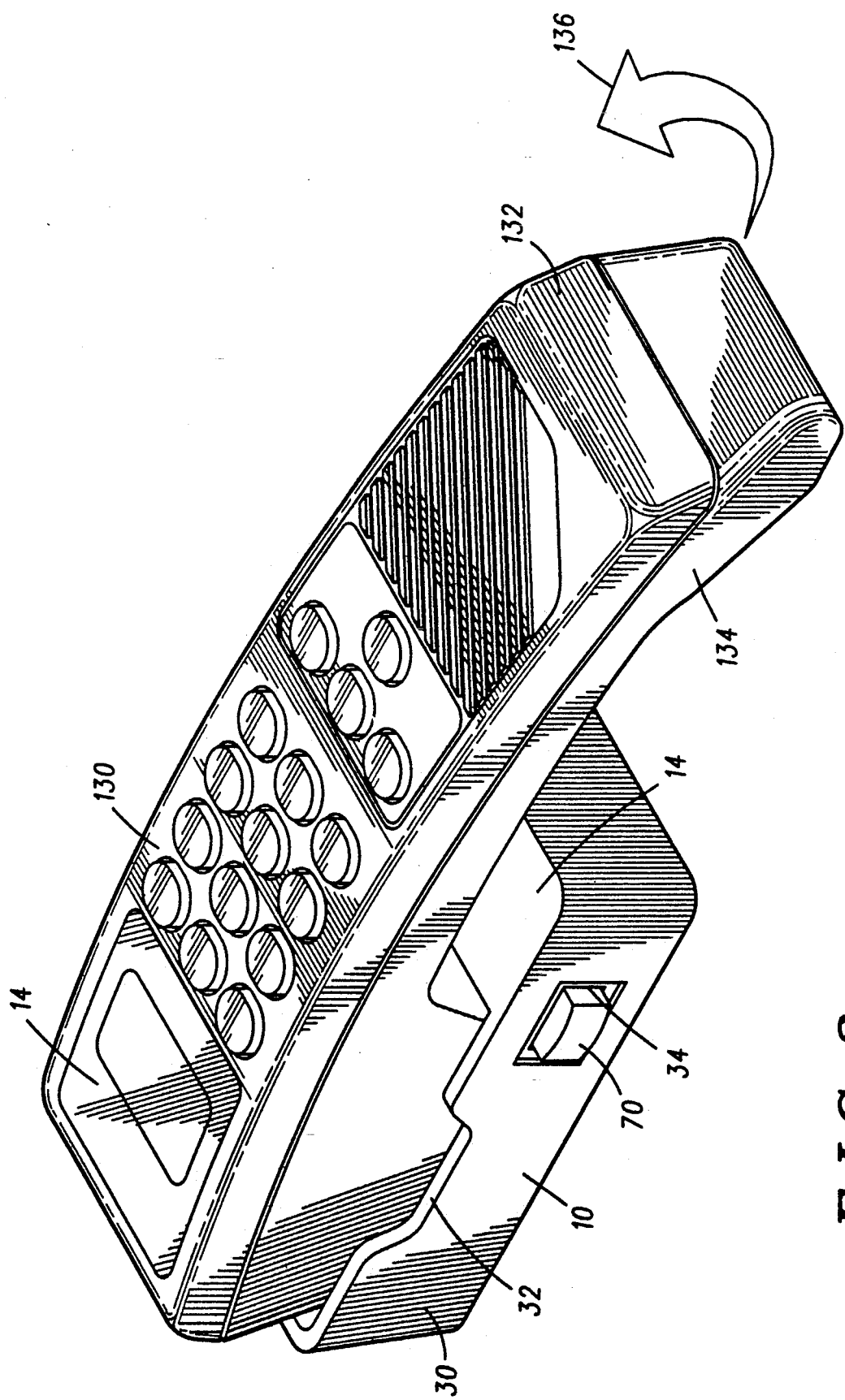
FIG. 3 is a perspective view of the telephone receptacle of the present invention having a telephone handset removably affixed thereto.

Turning now to the perspective illustration of FIG. 3, the telephone receptacle 10 of the present invention is positioned to affix telephone handset 130 thereto. Handset 130 is housed within a housing formed of top housing portion 132 and bottom housing portion 134. Latching surfaces are formed upon bottom housing portion 134 to permit latching engagement thereof with fixed latch member 49 and retractable latch member 50. Application of a force to force receiving surface 70 of plate member 66 extending through slotted opening 34 causes retraction of the latch surface 52 of retractable latch member 50 to permit removal of handset 130 from telephone receptacle 10. When latch member 50 is positioned in the release position 117, the reduced latching force permits the spring force exerted by spring 43 to push button 44 upwardly to disengage a face of telephone handset 130 from recessed surface 16, thereby removing the latching surfaces formed on the surface of handset 130 from latching engagement with latch 50 of receptacle 10. Flanged portions of tabs 46 and 48 limit continued upward movement of button 44.

An operator may remove the handset 130 from receptacle 10 by applying torque to the handset in the direction indicated by arrow 136. Handset 130 may be repositioned to be supported by the telephone receptacle 10 by positioning of the bottom portion 134 of the handset 130 in the recessed area defined by face surface 14 of the telephone receptacle. Positioning of bottom portion 134 in the recessed area exerts a force upon latch surface 52 of retractable latch member 50 to momentarily position latch surface 52 of latch member 50 in the release position. However, once the handset 130 is suitably repositioned, the latching surface formed thereupon permits translation again of latch member 50 (responsive to the spring force exerted by spring 58) to position latch surface 52 of latch member 50 again in the latch position 111.

The telephone receptacle 10 of the present invention may be advantageously utilized when mounted upon any mounting location of the automobile as an actuation force need only be applied to either force receiving surface 70 positioned at a left-hand side of the receptacle housing 12, or force receiving surface 72 positioned at a right-hand side of receptacle housing 12 to translate latch surface 52 of latch member 50 into the release position 117. When latch surface 52 is positioned in the release position 117, only a minimal amount of torque is required to remove the handset 130 from supportive engagement with telephone receptacle 10.

While the present invention has been described in connection with the preferred embodiments of the various figures, it is to be understood that other similar embodiments may be used and modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A telephone receptacle for receiving a portion of a telephone handset, the portion of the telephone handset having first and second handset latching surfaces formed thereupon, said telephone receptacle comprising:

a receptacle housing formed of first and second sidewalls, respectively, and a face surface interconnecting the first and second sidewalls, both said first and said second sidewall, respectively, having means forming openings extending therethrough;

means forming a recessed area extending into the face surface of the receptacle housing, the recessed area formed thereby defined by a recessed surface disposed beneath a plane defined by the face surface, and recessed area sidewalls interconnecting the recessed surface and the face surface, said recessed surface for receiving the portion of the telephone handset thereupon, at least one of said recessed area sidewalls having a fixed latch member formed to project therebeyond for engaging with the first handset latching surface formed upon the telephone handset, and at least one of said recessed area sidewalls having means forming an opening extending therethrough;

means forming a retractable latch member for extending through the opening extending through the at least one recessed area sidewall, the retractable latch member formed thereby movable to permit positioning thereof at either a latch position or a release position such that, when positioned at the latch position, the retractable latch member is operative to engage with the second handset latching surface formed upon the telephone handset;

means including a spring, engaging with the retractable latch member and capable of exerting a spring force thereupon, for maintaining the retractable latch member in the latch position;

a first plate member housed within the receptacle housing and having: an end portion thereof forming a force receiving surface, and a rail formed to extend along the length of the first plate member; said end portion of the first plate member extending through the opening formed to extend through the first sidewall of the receptacle housing;

a second plate member housed within the receptacle housing and having: an end portion thereof forming a force receiving surface, and a track formed to extend along the length of the second plate member; said end portion of the second plate member extending through the opening formed to extend through the second sidewall of the receptacle housing, wherein said track formed along the second plate member and the rail formed along the first plate are aligned theretogether in confronting engagement to permit sliding engagement therebetween such that application of an actuation force to the force receiving surfaces of either, or both, of the first or the second plate members, respectively, causes translation of the first and the second plate members whereby translation of the plate members causes positioning of the retractable latch member at the release position to release the telephone handset from the receptacle housing thereby permitting movement of the telephone handset thereaway.

2. A telephonic hang-up cup for supporting a telephonic handset therefrom, the telephonic handset having first and second handset latching surfaces formed thereupon, said telephonic hang-up cup comprising:

a receptacle housing formed of first and second sidewalls, respectively, and a face surface interconnecting the first and second sidewalls, both said first and said second sidewall, respectively, having means forming openings extending therethrough;

means forming a recessed area extending into the face surface of the receptacle housing, the recessed area formed thereby defined by a recessed surface disposed beneath a plane defined by the face surface, and recessed area sidewalls interconnecting the recessed surface and the face surface, said recessed surface for receiving the telephonic handset thereupon, at least one of said recessed area sidewalls having a fixed latch member formed to project therebeyond for engaging with the first handset latching surface formed upon the telephonic handset, and at least one of said recessed area sidewalls having means forming an opening extending therethrough;

means forming a retractable latch member for extending through the opening extending through the at least one recessed area sidewall, the retractable latch member formed thereby movable to permit positioning thereof at either a latch position or a release position such that, when positioned at the latch position, the retractable latch member is operative to engage with the second handset latching surface formed upon the telephonic handset;

means including a spring, engaging with the retractable latch member and capable of exerting a spring force thereupon, for maintaining the retractable latch member in the latch position;

a first plate member housed within the receptacle housing and having: an end portion thereof forming a force receiving surface, and a rail formed to extend along the length of the first plate member; said end portion of the first plate member extending through the opening formed to extend through the first sidewall of the receptacle housing;

a second plate member housed within the receptacle housing and having: an end portion thereof forming a force receiving surface, and a track formed to extend along the length of the second plate member; said end portion of the second plate member extending through the opening formed to extend through the second sidewall of the receptacle housing, wherein said track formed along the second plate member and the rail formed along the first plate are aligned theretogether in confronting engagement to permit sliding engagement therebetween such that application of an actuation force to the force receiving surfaces of either, or both, of the first or the second plate members, respectively, causes translation of the first and the second plate members whereby translation of the plate members causes positioning of the retractable latch member at the release position to release the telephonic handset from the receptacle housing thereby permitting movement of the telephonic handset thereaway.

3. A telephonic assembly comprising:

a telephone handset, said telephone handset having first and second handset latching surfaces formed thereupon;

a receptacle housing formed of first and second sidewalls, respectively, and a face surface interconnecting the first and second sidewalls, both said first and said second sidewall, respectively, having means forming openings extending therethrough;

means forming a recessed area extending into the face surface of the receptacle housing, the recessed area formed thereby defined by a recessed surface disposed beneath a plane defined by the face surface, and recessed area sidewalls interconnecting the recessed surface and the face surface, said recessed surface for receiving the telephone handset thereupon, at least one of said recessed area sidewalls having a fixed latch member formed to project therebeyond for engaging with the first handset latching surface formed upon the telephone handset, and at least one of said recessed area sidewalls having means forming an opening extending therethrough;

means forming a retractable latch member for extending through the opening extending through the at least one recessed area sidewall, the retractable latch member formed thereby movable to permit positioning thereof at either a latch position or a release position such that, when positioned at the latch position, the retractable latch member is operative to engage with the second handset latching surface formed upon the telephone handset;

means including a spring, engaging with the retractable latch member and capable of exerting a spring force thereupon, for maintaining the retractable latch member in the latch position;

a first plate member housed within the receptacle housing and having: an end portion thereof forming a force receiving surface, and a rail formed to extend along the length of the first plate member; said end portion of the first plate member extending through the opening formed to extend through the first sidewall of the receptacle housing;

a second plate member housed within the receptacle housing and having: an end portion thereof forming a force receiving surface, and a track formed to extend along the length of the second plate member; said end portion of the second plate member extending through the opening formed to extend through the second sidewall of the receptacle housing, wherein said track formed along the second plate member and the rail formed along the first plate are aligned theretogether in confronting engagement to permit sliding engagement therebetween such that application of an actuation force to the force receiving surfaces of either, or both, of the first or the second plate members, respectively, causes translation of the first and the second plate members whereby translation of the plate members causes positioning of the retractable latch member at the release position to release the telephone handset from the receptacle housing thereby permitting movement of the telephone handset thereaway.

* * * * *

UNITED STATES PATENT AND TRADEMARK OFFICE
CERTIFICATE OF CORRECTION

PATENT NO. : 5,113,436
DATED : May 12, 1992
INVENTOR(S) : John Jarvela and Michael Spence It is certified that error appears in the above-identified patent and that said Letters Patent is hereby corrected as shown below:

On the title page, item (54):

"Rectractable" should be --Retractable--.

Signed and Sealed this

Twenty-eighth Day of September, 1993

Attest:

BRUCE LEHMAN

Attesting Officer     *Commissioner of Patents and Trademarks*